United States Patent [19]
Tait

[11] Patent Number: 5,839,642
[45] Date of Patent: Nov. 24, 1998

[54] HAND-HELD SOLDER WIRE DISPENSER

[76] Inventor: Chris Tait, 581 Roanoke Rd, Kelowna BC, Canada, V1Y 7K6

[21] Appl. No.: 832,445

[22] Filed: Apr. 3, 1997

[51] Int. Cl.⁶ .................................................. B23K 3/06
[52] U.S. Cl. ............................................ 228/41; 242/557
[58] Field of Search .................. 228/41, 52, 13, 228/244; 242/557; 219/137.2, 227; 14/2

[56] References Cited

U.S. PATENT DOCUMENTS

| | | | |
|---|---|---|---|
| 4,932,581 | 6/1990 | Ohle et al. ................................. | 228/41 |
| 5,155,332 | 10/1992 | Maguire ..................................... | 228/41 |
| 5,421,505 | 6/1995 | Hild, II ..................................... | 228/41 |

*Primary Examiner*—Samuel M. Heinrich

[57] ABSTRACT

A new hand-held solder wire dispenser for conveniently dispensing lengths of solder during a soldering operation. The inventive device includes a rectangular housing with a spool of solder wire mounted in the housing, and a manual actuation apparatus for dispensing the solder wire through a wall of the housing. An electric version of the dispenser includes a reversible electric motor driving a pair of rubber drive wheels which frictionally engage the solder wire on opposite sides thereof, for causing dispensing movement of the wire.

12 Claims, 4 Drawing Sheets

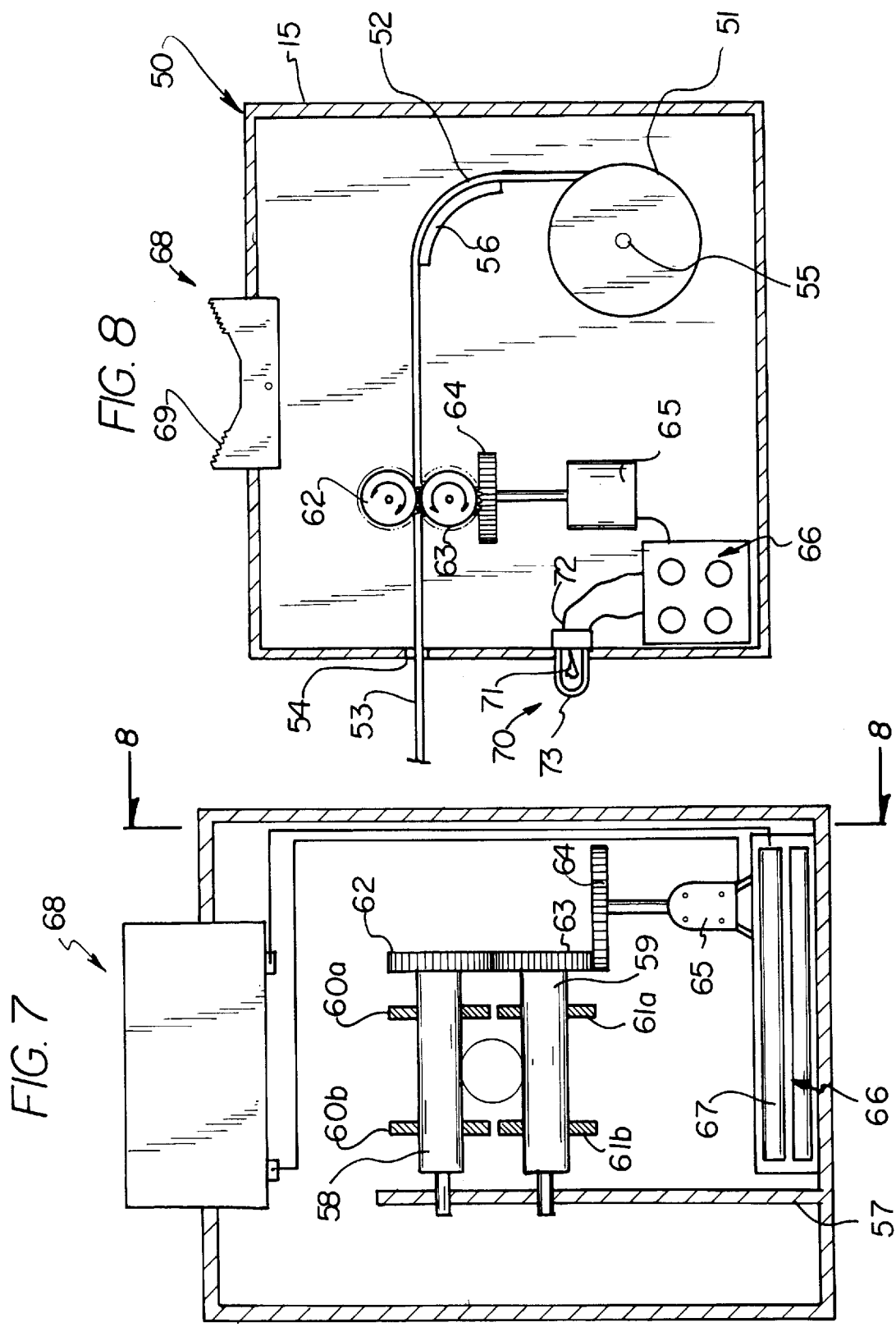

HAND-HELD SOLDER WIRE DISPENSER

BACKGROUND OF THE INVENTION

1. Field of the Invention

The present invention relates to solder dispensers and more particularly pertains to a new hand-held solder wire dispenser for conveniently and easily dispensing lengths of solder during a soldering operation.

2. Description of the Prior Art

The use of solder dispensers is known in the prior art. More specifically, solder dispensers heretofore devised and utilized are known to consist basically of familiar, expected and obvious structural configurations, notwithstanding the myriad of designs encompassed by the crowded prior art which have been developed for the fulfillment of countless objectives and requirements.

Known prior art solder dispensers and/or soldering irons include U.S. Pat. No. 5,421,505; U.S. Pat. No. 5,423,472; U.S. Pat. No. 4,690,318; U.S. Pat. No. 5,261,590; U.S. Pat. No. Des. 266,980 and U.S. Pat. No. 5,031,817.

While these devices fulfill their respective, particular objectives and requirements, the aforementioned patents do not disclose a new handheld solder wire dispenser. The inventive device includes a rectangular housing with a spool of solder wire mounted in the housing, and a manual actuation apparatus for dispensing the solder wire through a wall of the housing. An electric version of the dispenser includes a reversible electric motor driving a pair of rubber drive wheels which frictionally engage the solder wire on opposite sides thereof, for causing dispensing movement of the wire.

In these respects, the hand-held solder wire dispenser according to the present invention substantially departs from the conventional concepts and designs of the prior art, and in so doing provides an apparatus primarily developed for the purpose of conveniently dispensing lengths of solder during a soldering operation.

SUMMARY OF THE INVENTION

In view of the foregoing disadvantages inherent in the known types of solder dispensers now present in the prior art, the present invention provides a new hand-held solder wire dispenser construction wherein the same can be utilized for conveniently dispensing lengths of solder during a soldering operation.

The general purpose of the present invention, which will be described subsequently in greater detail, is to provide a new hand-held solder wire dispenser apparatus and method which has many of the advantages of the solder dispensers mentioned heretofore and many novel features that result in a new hand-held solder wire dispenser which is not anticipated, rendered obvious, suggested, or even implied by any of the prior art solder dispensers, either alone or in any combination thereof.

To attain this, the present invention generally comprises a rectangular housing with a spool of solder wire mounted in the housing, and a manual actuation apparatus for dispensing the solder wire through a wall of the housing. An electric version of the dispenser includes a reversible electric motor driving a pair of rubber drive wheels which frictionally engage the solder wire on opposite sides thereof, for causing dispensing movement of the wire.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new hand-held solder wire dispenser apparatus and method which has many of the advantages of the solder dispensers mentioned heretofore and many novel features that result in a new hand-held solder wire dispenser which is not anticipated, rendered obvious, suggested, or even implied by any of the prior art solder dispensers, either alone or in any combination thereof.

It is another object of the present invention to provide a new hand-held solder wire dispenser which may be easily and efficiently manufactured and marketed.

It is a further object of the present invention to provide a new hand-held solder wire dispenser which is of a durable and reliable construction.

An even further object of the present invention is to provide a new hand-held solder wire dispenser which is susceptible of a low cost of manufacture with regard to both materials and labor, and which accordingly is then susceptible of low prices of sale to the consuming public, thereby making such hand-held solder wire dispenser economically available to the buying public.

Still yet another object of the present invention is to provide a new hand-held solder wire dispenser which provides in the apparatuses and methods of the prior art some of the advantages thereof, while simultaneously overcoming some of the disadvantages normally associated therewith.

Still another object of the present invention is to provide a new hand-held solder wire dispenser for conveniently dispensing lengths of solder during a soldering operation.

Yet another object of the present invention is to provide a new hand-held solder wire dispenser which includes a rectangular housing with a spool of solder wire mounted in the housing, and a manual actuation apparatus for dispensing the solder wire through a wall of the housing.

Another object of the present invention is to provide a new hand-held solder wire dispenser which includes a reversible electric motor driving a pair of rubber drive wheels which frictionally engage the solder wire on opposite sides thereof, for causing dispensing movement of the wire.

Still yet another object of the present invention is to provide a new hand-held solder wire dispenser that eliminates the need to use both hands to pull more solder off of the spool.

Even still another object of the present invention is to provide a new hand-held solder wire dispenser that allows a user to accurately manipulate and hold the solder end at the proper soldering point.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is an end view of an alternate, electric driven solder wire dispenser, taken along line 7—7 of FIG. 8.

FIG. 8 is a cross sectional view taken along line 8—8 of FIG. 7.

DESCRIPTION OF THE PREFERRED EMBODIMENT

Figure 1:
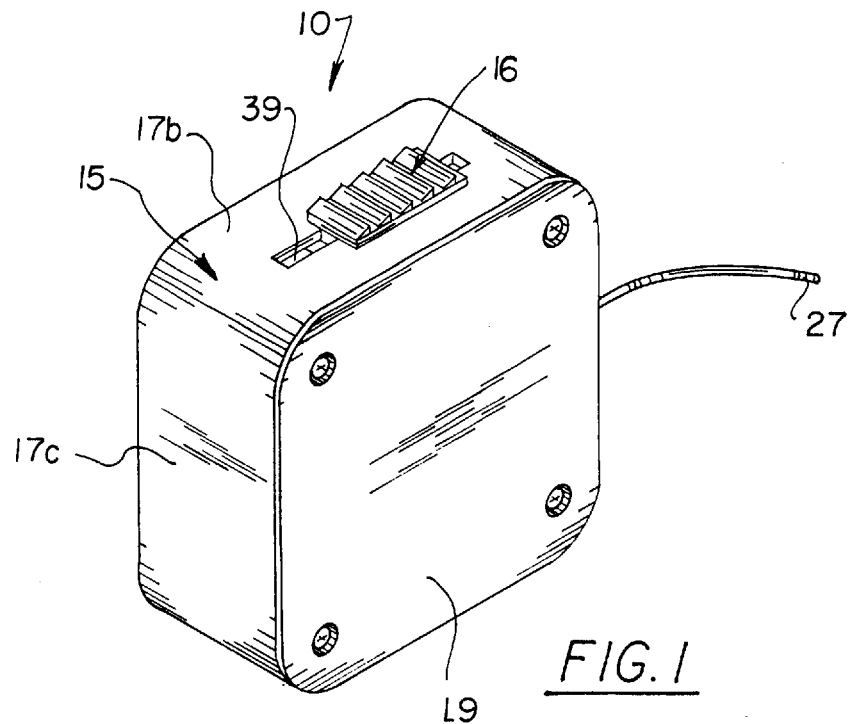
FIG. 1 is a perspective view of a new hand-held solder wire dispenser according to the present invention.
Figure 2:
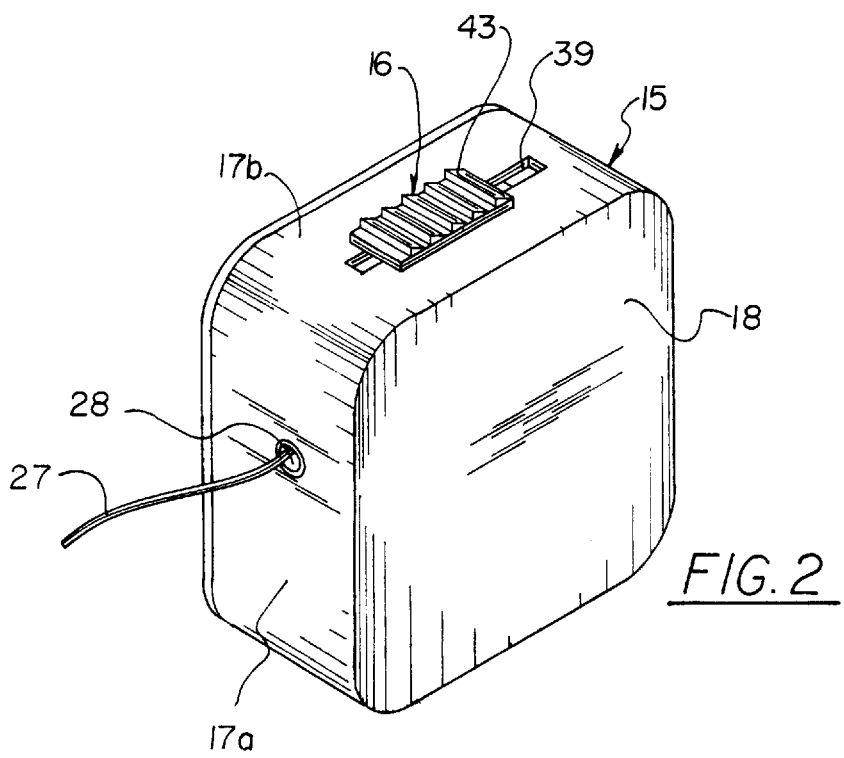
FIG. 2 is a perspective view showing the dispensing hole.
Figure 3:
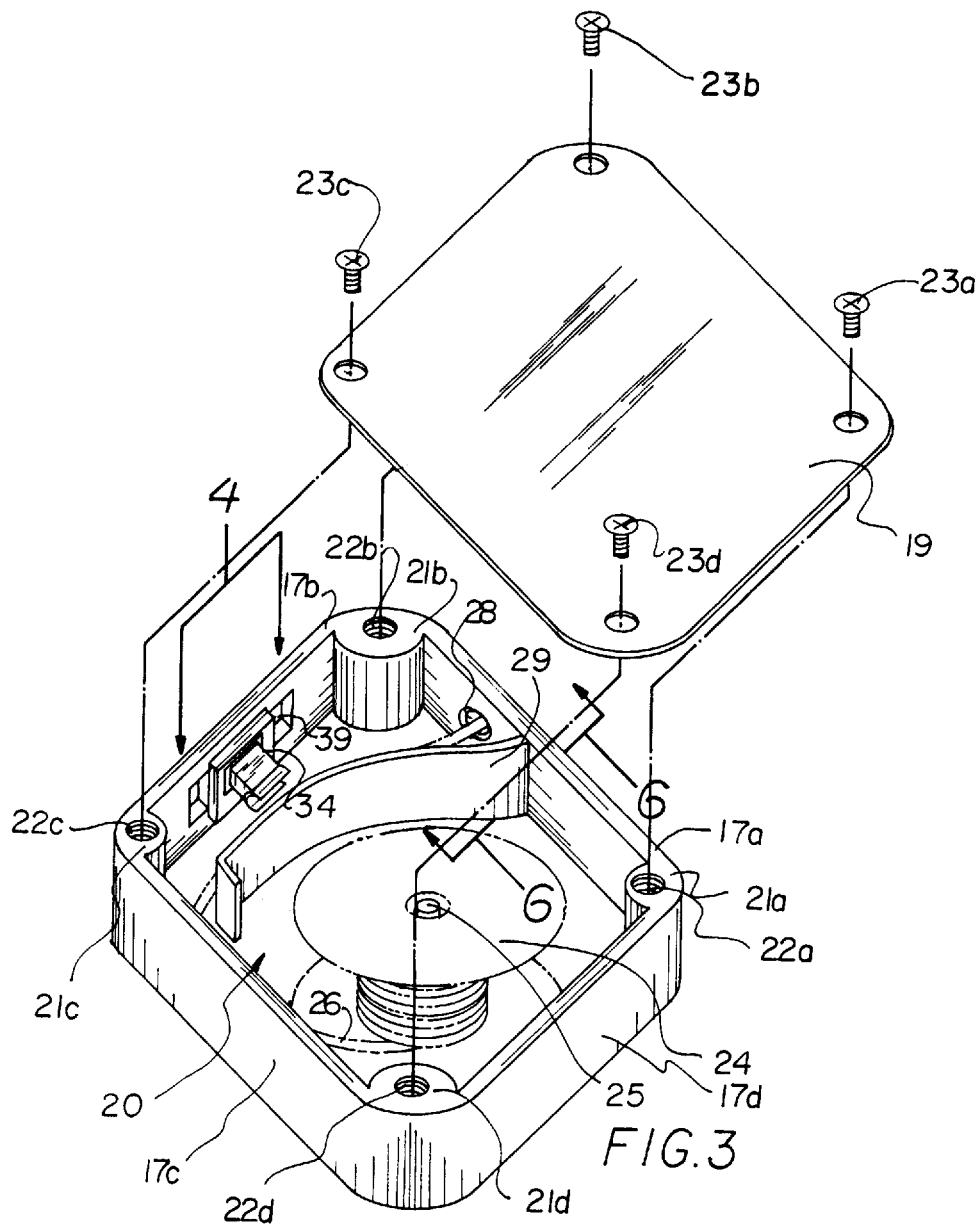
FIG. 3 is an exploded isometric illustration of the present invention.
Figure 4:
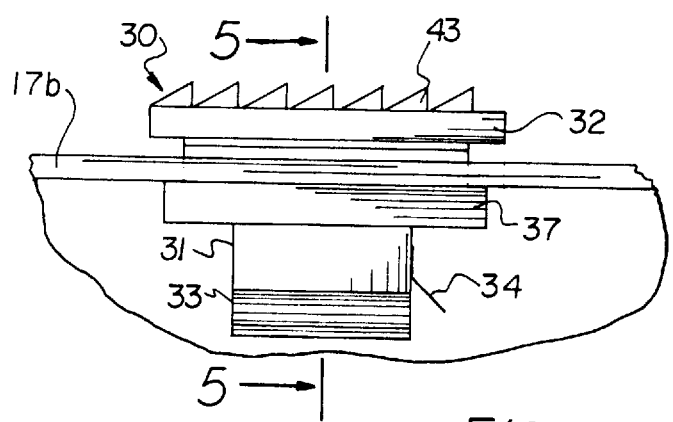
FIG. 4 is a view taken along line 4—4 of FIG. 3.

With reference now to the drawings, and in particular to FIGS. 1 through 6 thereof, a new hand-held solder wire dispenser embodying the principles and concepts of the present invention and generally designated by the reference numeral 10 will be described.

More specifically, it will be noted that the hand-held solder wire dispenser 10 comprises a housing 15 and an actuation means 16 attached thereto.

As best illustrated in FIGS. 1 through 6, it can be shown that the housing 15 includes four side walls 17a–d, an end wall 18 integral with the side walls, and a removable end wall 19, defining a generally rectangular shape. When assembled, the walls 17a–d, 18, and 19 define a cavity 20. Each inside corner of the housing 15 includes enlarged portions 21a–d having threaded apertures 22a–d which receive threaded screws 23a–d for removably attaching the end wall 19 to the rest of the housing 15.

A solder spool 24 is mounted on a stationary support post 25 inside the cavity 20, such that the spool is able to rotate about the post 25. Solder wire 26 is wound around the spool, and the wire 26 includes a free end 27 extending through a dispensing aperture 28 in the side wall 17a. The wire 26 extends within the cavity 20 around a stationary wire guide 29 which extends from the side wall 17a but ends just short of the end wall 17c to allow passage of the wire. The wire guide 29 is located in the housing such that the wire 26 is pressed against the upper surface thereof by the actuation means 16 when dispensing solder wire from the housing 15.

The actuation means 16 is mounted on the side wall 17b for longitudinal sliding movement relative thereto. The actuation means 16 includes a T-shaped feeder member 30 having a post 31 and a cross bar 32. The post 31 includes a gripping end having a semi-cylindrical gripping member 33 and a sharpened projection 34 slightly in front of the member 33. Each end of the cross bar 32 includes a flange 35, 36 extending downward therefrom and disposed above the surface of the side wall 17b.

Figure 5:
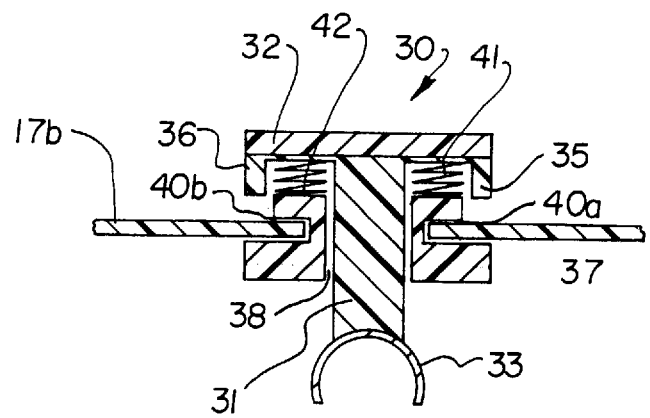
FIG. 5 is a cross sectional view taken along line 5—5 of FIG. 4.
Figure 6:
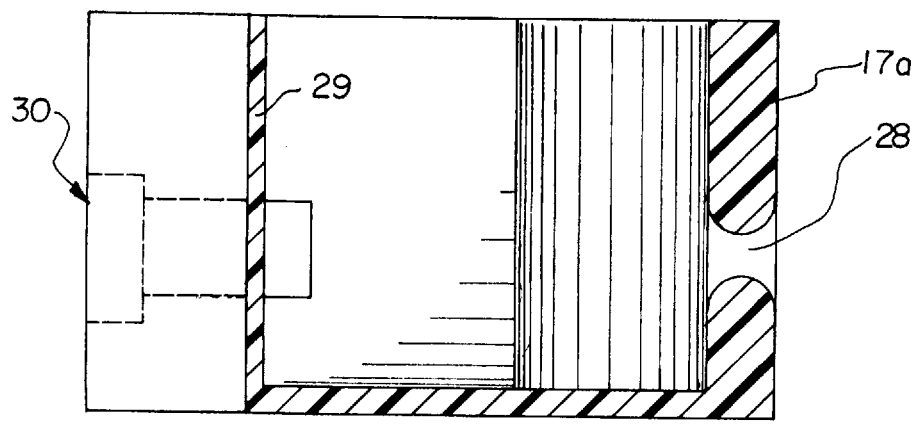
FIG. 6 is a cross sectional view taken along line 6—6 of FIG. 3.

The feeder member 30 is supported on the side wall 17b by a carriage 37. The carriage 37 is a rectangular member having a central passage 38 through which the post 31 extends. The carriage fits within a slot 39 formed in the side wall 17b for sliding movement along the slot 39. The edges defining the slot fit within recesses 40a, b of the carriage, thus securing the carriage within the slot and permitting the sliding movement. As seen in FIG. 5, the top of the carriage fits between the flanges 35, 36. Springs 41, 42 are disposed between the top of the carriage and the cross bar 32 to bias the feeder member away from the carriage. Thus it is clear that the feeder member 30 can be pushed inward relative to the carriage against the spring bias.

The post 31, gripping member 33, and sharpened projection 34 are sized and located relative to each other such that when the feeder member 30 is pushed inward, the gripping member engages the solder wire 26 pushing it into contact with the wire guide 29. Thus the wire 26 is held between the gripping member 33 and the wire guide. Additionally, when the feeder member is pushed inward, the sharpened projection 34 digs into the relatively soft solder wire. Then by sliding the feeder member and carriage forward within the slot 39, the solder wire is caused to move along with this movement, and is therefore dispensed out of the aperture 28. Releasing the feeder member 30 at the end of the dispensing motion pulls the sharp projection and gripping member from contact with the wire, permitting the user to pull the feeder member and carriage backwards for another dispensing movement thereof. Note that the top surface of the cross bar 32 is roughened to facilitate the sliding movements of the feeder member and carriage, such as by projections 43.

In use, the user uses his thumb, or other finger, to first push the feeder member 30 inward until the wire is engaged between the portion 33 and the guide 29, and the sharp projection 34 digs into the solder wire. While the member is still pushed in, the user slides the member and carriage forward in the slot, thus causing the wire to be dispensed. The user releases the member 30 causing it to be disengaged from the wire, and then the member and carriage are slid backward to the rear of the slot. Another dispensing motion of the member and carriage can now be made.

Instead of being manually dispensed, FIGS. 7 and 8 teach a hand-held solder wire dispenser 50 where the wire is electrically dispensed. As in the embodiment shown in FIGS. 1–6, the dispenser 50 includes a rectangular housing 15 defined by four side walls, an integral end wall, and a removable end wall to define a housing cavity. Disposed within the cavity is a solder spool 51 containing solder wire 52, rotationally mounted on a stationary support post 55. The wire includes a free end 53 extending through a dispensing aperture 54 in one of the side walls. A wire guide 56 is mounted within the cavity for guiding the solder wire from the spool 51. The device 50 thus far described is thus similar to the device 10.

However, the device 50 differs from the device 10 in the mechanism for causing movement of the wire through the aperture 54. As best shown in FIG. 7, a stationary support 57 is mounted within the housing cavity. A pair of cylindrical wheels 58, 59 are rotationally supported by the support 57, such that the wheels 58, 59 are located on either side of the wire 52 and in contact therewith. The wheels 58, 59 are preferably rubber, although wheels of any material having rubber coverings could be used. Cylindrical guide rails 60a, 60b and 61a, 61b are mounted to the wheels 58 and 59, respectively, with the wire 52 located therebetween to prevent large lateral movement of the wire due to it unrolling from the spool.

The wheels 58, 59 are oppositely rotated, and for this purpose include driven gears 62, 63 in meshing contact with each other. The gears 62, 63 are themselves rotated by a drive gear 64 driven by an electric motor 65 mounted within the cavity. The motor 65 is a reversible electric motor such that the drive gear 64 can be driven in opposite directions. Power for the motor is provided by a power supply means 66 within the housing cavity, such as a plurality of batteries 67.

Three position rocker switch 68 is appropriately pivotally mounted in one of the side walls. The switch 68 provides three motor driving states, a forward state, a no rotation neutral state, and a motor reverse state. Thus depending upon the pivoted position of the switch 68, the motor is either driven in a direction such that the wheels 58, 59 frictionally drive the wire in a dispensing direction, the motor is off with no driving motion, or the motor is reversely driven to rotate the wheels 58, 59 in an opposite direction to frictionally reel the wire in. The switch, motor, and power supply are all electrically connected in a manner known to one having ordinary skill in the art. The switch 68 includes roughened surfaces 69 for facilitating the pivoting motion thereof.

To provide illumination of the soldering location, an illumination means 70 is provided. The illumination means is disposed in the same side wall as the dispensing aperture 54, and below the aperture. However, it should be recognized that the illumination means could be disposed above the aperture. The illumination means includes a light bulb 71 extending through the side wall and supported within a socket 72. A clear housing 73 of plastic or glass is attached to the side wall and surrounds the bulb 71, thus protecting the bulb 71 from breakage. The bulb 71 is connected with the power supply in a well known manner. When illuminated, the bulb provides sufficient light to assist in a soldering operation. The bulb can be electrically connected such that it is illuminated only at selected times, such as when the rocker switch is in the forward or neutral state, or the bulb can be operated by an on/off switch.

In use of the device 50, the housing 15 is hand-held and the user actuates the switch 68 using his thumb, or other finger, by rocking the switch to one of its three positions. When wire is to be dispensed, the switch is pivoted to the dispensing position, thus the motor is driven forwardly which rotates the wheels 58, 59 in a direction to frictionally drive the wire so it is dispensed from the aperture 54. When no more wire is desired, the switch is pivoted to the neutral position, thus stopping motor rotation. If the user decides to reel in some of the wire, the switch is pivoted to the reverse position, thus the motor is driven in a reverse direction, causing the wheels 58, 59 to rotate reversely, thus frictionally pulling the wire into the housing.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A hand-held solder wire dispenser comprising:
   a housing having a plurality of side walls and top and bottom end walls, said walls defining a housing cavity;
   a spool of solder wire rotationally mounted in the housing cavity, said solder wire having a free end extending through a dispensing aperture in one of said side walls; and
   actuation means mounted on another of said side walls for unrolling solder wire from the spool and causing movement of the solder wire through said dispensing aperture, said actuation means mounted for sliding movement longitudinally on said another side wall.

2. The hand-held solder wire dispenser of claim 1, wherein one of the top and bottom end walls is removable.

3. The hand-held solder wire dispenser of claim 1, wherein the actuation means comprises a feeder member riding on a carriage slidably disposed within a longitudinal slot in said another side wall, said feeder member and said carriage being manually slid back and forth in said slot to dispense the solder wire through the dispensing aperture.

4. The hand-held solder wire dispenser of claim 3, further comprising a spring bias means between the feeder member and the carriage to bias the feeder member away from the carriage.

5. The hand-held solder wire dispenser of claim 4, wherein the feeder member includes a gripping end, said gripping end including a sharp projection selectively engaged with the solder wire.

6. The hand-held solder wire dispenser of claim 1, wherein the housing is substantially rectangular.

7. A hand-held solder wire dispenser comprising:
   a housing having a plurality of side walls and top and bottom end walls, said walls defining a housing cavity;
   a spool of solder wire rotationally mounted in the housing cavity, said solder wire having a free end extending through a dispensing aperture in one of said side walls;
   friction drive means mounted in the housing cavity and engaged with the solder wire for causing unrolling movement of the solder wire from the spool and movement through the dispensing aperture;

motor means mounted in the housing cavity for driving the friction drive means;

power supply means disposed in the housing cavity for supplying power to the motor means; and control means mounted on another of said side walls for selectively controlling the motor means.

8. The hand-held solder wire dispenser of claim 7, wherein the friction drive means comprises a pair of cylindrical, rubber wheels engaged with opposite sides of the solder wire.

9. The hand-held solder wire dispenser of claim 8, wherein each wheel includes a pair of cylindrical guide rails attached thereto, the solder wire being disposed between the guide rails to limit lateral movement of the solder wire.

10. The hand-held solder wire dispenser of claim 7, wherein the motor means comprises a reversible electric motor, and said control means comprises a three position rocker switch.

11. The hand-held solder wire dispenser of claim 10, wherein the power supply means comprises a plurality of batteries.

12. The hand-held solder wire dispenser of claim 7, further comprising illumination means extending through said one side wall for providing illumination adjacent the free end of the solder wire.

* * * * *